(12) United States Patent
Gieske et al.

(10) Patent No.: US 11,994,990 B2
(45) Date of Patent: May 28, 2024

(54) MEMORY MEDIA ROW ACTIVATION-BIASED CACHING

(71) Applicant: Micron Technology, Inc., Boise, ID (US)

(72) Inventors: Edmund Gieske, Boise, ID (US); Cagdas Dirik, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/941,558

(22) Filed: Sep. 9, 2022

(65) Prior Publication Data

US 2023/0236968 A1 Jul. 27, 2023

Related U.S. Application Data

(60) Provisional application No. 63/301,991, filed on Jan. 21, 2022.

(51) Int. Cl.
*G06F 12/0802* (2016.01)

(52) U.S. Cl.
CPC .. *G06F 12/0802* (2013.01); *G06F 2212/1032* (2013.01)

(58) Field of Classification Search
CPC ............... G06F 12/0802; G06F 2212/1032
See application file for complete search history.

(56) References Cited

U.S. PATENT DOCUMENTS

| | | | |
|---|---|---|---|
| 2016/0085691 A1* | 3/2016 | Benedict | G06F 12/0806 711/136 |
| 2023/0315299 A1* | 10/2023 | Qureshi | G06F 3/0638 711/154 |

* cited by examiner

*Primary Examiner* — Mark A Giardino, Jr.
(74) *Attorney, Agent, or Firm* — Wood IP LLC; Theodore A. Wood

(57) ABSTRACT

A cache memory having a memory media device row activation-biased caching policy is described. The cache policies that are biased based on row activation counts include at least one of a cache line eviction policy which determines which cache lines are the most evictable from the cache memory, and cache line storage policy which determined which row data is allocated cache lines for storage. A memory controller including a row activation-biased cache memory is also described. The memory media device may be DRAM.

18 Claims, 11 Drawing Sheets

| Row Hammer Response | Data Integrity Affected? | Needs Metadata Response? | Required Time to Respond | Impact Granularity |
|---|---|---|---|---|
| Bias Cache Replacement | < associativity | No | 0 | Cache set |
| Increased Refresh | No | No | ~300nS ($t_{RC}$) | Logical Bank |
| ACT/PRE Neighbor Rows | Yes | Yes | ≥90nS ($2\times t_{RC}$) | ≥2 Rows |
| Poor-man's dRFM | Yes | No | 1uS ($2\times 5\times RFM+t_{RC}$) | ≥1 Rows |
| dRFM | Yes | No | 200nS | ≥1 Rows |
| EDAC Scrub Neighbors ** | Yes++ | Yes | ≥5uS? ($4\times t_{RC}+256\times t_{CD}$) | ≥2 Rows |
| Throttle ACTs to CRHA Rows | Yes | No | ≥10uS (allowed ACT rate) | ≥1 Rows |
| Respond w/ Data_Bad | Yes | No | 0 | ≥1 Rows |
| Alert (interrupt) Host OS | w/ other | No | >100uS on host | ≥1 Rows |

MEMORY MEDIA ROW ACTIVATION-BIASED CACHING

CROSS REFERENCE TO RELATED APPLICATIONS

This application claims priority from U.S. Provisional Application No. 63/301,991, filed Jan. 21, 2022, the contents of which is hereby incorporated by reference. Additionally, this application is related to the following commonly assigned U.S. Patent Applications: entitled "Cache-Assisted Row Hammer Mitigation;" entitled "RHR Interrupts to the Operating System;" entitled "Practical Space Saving Row Hammer Detector;" entitled "Area Optimized RHR Solution for the CXL Controller;" entitled "Optimized Control of Commands Running in a Cache;" entitled "Control of the Back Pressure Based on a Total Number of Buffered Read and Write Entries;" and entitled "Arbitration Policy to Prioritize Read Command Dequeing by Delaying Write Command Dequeing," the contents of each of which is hereby incorporated by reference.

FIELD OF TECHNOLOGY

The present disclosure relates to cache memory and in particular cache memory that is coordinated with row activation count monitoring in memory media.

BACKGROUND

Memory devices (also referred to as "memory media devices") are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), flash memory, and others. Memory devices may be volatile or non-volatile. Volatile memory cells (e.g., DRAM cells) may lose their programmed states over time unless they are periodically refreshed by an external power source. SRAM memory may maintain their programmed states for the duration of the system being powered on. Non-volatile memory cells (e.g., NAND memory cells) may maintain their programmed states for extended periods of time even in the absence of an external power source.

Memory devices may be coupled to a host (e.g., a host computing device) to store data, commands, and/or instructions for use by the host while the computer or other electronic system is operating. For example, data, commands, and/or instructions can be transferred between the host and the memory device(s) during operation of a computing or other electronic system. A controller, referred to as a "memory controller", may be used to manage the transfer of data, commands, and/or instructions between the host and the memory devices.

DRAM is organized as an array of storage cells with each cell storing a programmed value. As noted above, the cells can lose their programmed values if not periodically refreshed. Thus, the rows are refreshed at a fixed interval often referred to as the "refresh interval". The refresh is also called a "row activation". In a row activation, a row in the DRAM device is read, error corrected and written back to that same physical row. Data corruption caused by "row hammer events" (also referred to as "row hammer attacks") are a significant risk in recent DRAM devices.

A row hammer event occurs when a particular row in a media device is accessed too many times, that is, more than a "row hammer threshold" (RHT) number of times, in an "activation interval" (i.e., the interval between two refresh/activation events). Specifically, when a particular row (an "aggressor row") is accessed more than a RHT number of times during an activation interval, one or more rows ("victim rows") that are physically proximate to that particular row in the DRAM media can be affected as a result of the frequent activation of the particular row, and data corruption of the one or more rows may occur. Due to various physical effects of shrinking manufacturing process geometries, the RHT of memory devices has decreased to a level at which even normal computer system programs can inadvertently corrupt their own data or the data of another program sharing the same system's memory.

Some memory media devices include circuitry for detecting and mitigating row hammer attacks. Conventional row hammer detector techniques, such as "Address Sampling" and "Priority CAM" (priority content addressable memory) are probabilistic and thus cannot guarantee perfect (i.e., complete, accurate, and precise) prevention of data corruption in any and all row hammer scenarios. If an aggressor (e.g., a malicious attacker) knows sufficient details of these conventional row hammer detection methods and their implementation, the aggressor can attack their weaknesses to bypass or break them and corrupt data. Therefore, improved techniques for mitigating soft errors such as row hammer errors are desired.

BRIEF DESCRIPTION OF THE DRAWINGS

FIG. 7 illustrates a table of different row hammer attack responses that can be implemented, according to some example embodiments.

DETAILED DESCRIPTION

In example embodiments, the row hammer detector (described herein) may be located in a "memory controller." The memory controller can orchestrate performance of operations to write data to, or read data from, at least one of multiple types of memory devices. At least in some embodiments, the memory controller also includes the cache memory that operates in association with the row hammer detector. In other embodiments, the cache memory may be located externally to the memory controller. For example, in some embodiments, the cache may be connected to the memory controller by a cache memory interface.

Figure 1A:
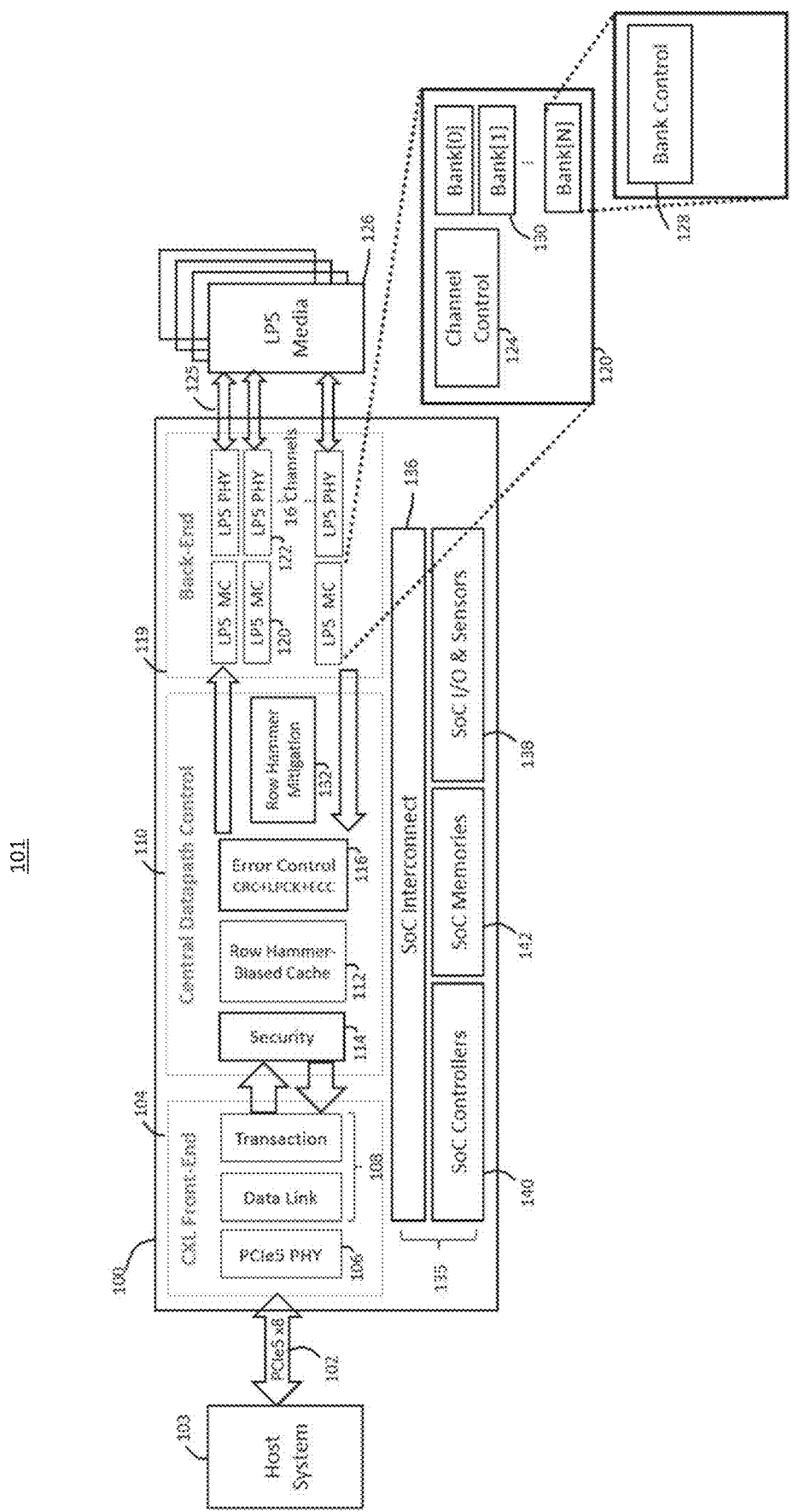
FIG. 1A illustrates an example functional block diagram in the form of a computing system including a memory controller configured for detecting row hammer attacks and utilizing a cache memory that implements a row activation-biased cache policy in accordance with some example embodiments of the present disclosure.

FIG. 1A illustrates an example functional block diagram in the form of a computing system 101 including a memory controller 100 configured for detecting row hammer attacks in accordance with some embodiments of the present disclosure. The computing system 101 can detect and mitigate row hammer attacks on one or more memory media devices 126. The memory controller 100 comprises a front end portion 104, a central controller portion 110, a back end portion 119, and a management unit 135. The memory controller 100 can be coupled to a host 103 (i.e., host system 103) and memory media device 126. In some embodiments, memory media device 126 may be a DRAM device.

The front end portion 104 includes an interface 106 to couple the memory controller 100 to the host 103 through one or more input/output (I/O) lanes 102. The communications over I/O lanes 102 may be according to a protocol such as, for example, Peripheral Component Interconnect Express (PCIe). In some embodiments, the plurality of I/O lanes 102 can be configured as a single port. Example embodiments are not limited by the number of I/O lanes, whether the I/O lanes belong to a single port, or the communication protocol for communicating with the host.

The interface 106 receives data and/or commands from host 103 through I/O lanes 102. In an embodiment, the interface 106 is a physical (PHY) interface configured for PCIe communications. The front end portion 104 may include interface management circuitry 108 (including data link and transaction control) which may provide higher layer protocol support for communications with host 103 through PHY interface 106.

The central controller portion 110 is configured to control, in response to receiving a request or command from host 103, performance of a memory operation. The memory operation can be a memory operation to read data from, or write data to, memory media device 126. The central controller portion 110 may comprise a security component 114 configured to encrypt the data before storing, and to decrypt data after reading, the data in memory media device 126. In some embodiments, the central controller portion 110 may also include a cache memory 112 to store data associated with the performance of the memory operation, In some embodiments, in response to receiving a request from host 103, data read from or written to memory media device 126 can be stored in cache lines of cache memory 112. The data in the cache memory can be written to memory media device 126. An error correction component 116 is configured to provide error correction to data read from and/or written to memory media device 126. In some embodiments, the data can be encrypted using an encryption protocol such as, for example, Advanced Encryption Standard (AES) encryption, before the data is stored in the cache memory. In some embodiments, the central controller portion 110 can, in response to receiving a request from host 103, control writing of multiple pages of data substantially simultaneously to memory media device 126.

In some embodiments, the central controller portion also includes a row hammer mitigation circuitry 132 which operates to track row activations in memory media devices and to, based on the tracking, mitigate row hammer attacks. The cache 112 may be configured to adapt its caching policies based on row activation information provided by the row hammer mitigation circuitry 132.

The management unit 135 is configured to control operations of the memory controller 100. The management unit may recognize commands from the host 103 and accordingly manage the one or more memory media devices 126. In some embodiments, the management unit 135 includes an I/O bus 138 to manage out-of-band data, a management unit controller 140 to execute a firmware whose functionalities include, but not limited to, monitoring and configuring the characteristics of the memory controller 100, and a management unit memory 142 to store data associated with memory controller 100 functionalities. The management unit controller 140 may also execute instructions associated with initializing and configuring the characteristics of the memory controller 100. An endpoint of the management unit 135 can be exposed to the host system 103 to manage data through a communication channel using the I/O bus 138.

A second endpoint of the management unit 135 can be exposed to the host system 103 to manage data through a communication channel using interface 106. In some embodiments, the characteristics monitored by the management unit 135 can include a voltage supplied to the memory controller 100 or a temperature measured by an external sensor, or both. Further, the management unit 135 can include a local bus interconnect 136 to couple different components of the memory controller 100. In some embodiments, the local bus interconnect 136 can include, but is not limited to, an advanced high performance bus (AHB).

The management unit 135 can include a management unit controller 140. In some embodiments, the management unit controller 140 can be a controller that meets the Joint Test Action Group (JTAG) standard and operate according to an Inter-Integrate Circuit (I2C) protocol, and auxiliary I/O circuitry. As used herein, the term "JTAG" generally refers to an industry standard for verifying designs and testing printed circuitry boards after manufacture. As used herein, the term "I2C" generally refers to a serial protocol for a two-wire interface to connect low-speed devices like microcontrollers, I/O interfaces, and other similar peripherals in embedded systems.

The back end portion 119 is configured to couple to one or more types of memory media devices (e.g., DRAM media 126) via (e.g., through) a plurality of channels 125, which can be used to read/write data to/from the memory media devices 126, to transmit commands to memory media device 126, to receive status and statistics from memory media device 126, etc. The management unit 135 can couple, by initializing and/or configuring the memory controller 100 and/or the memory media device 126 accordingly, the memory controller 100 to external circuitry or an external device, such as host 103 that can generate requests to read or write data to and/or from the memory media device(s). The management unit 135 is configured to recognize received commands from the host 103 and to execute instructions to apply a particular operation code associated with received host commands for each of a plurality of channels coupled to the memory media device 126.

The back end portion 119 includes a media controller portion comprising a plurality of media controllers 120 and a physical (PHY) layer portion comprising a plurality of PHY interfaces 122. In some embodiments, the back end portion 119 is configured to couple the PHY interfaces 122 to a plurality of memory ranks of the memory device 126. Memory ranks can be connected to the memory controller 100 via a plurality of channels 125. A respective media controller 120 and a corresponding PHY interface 122 may drive a channel 125 to a memory rank. In some embodiments, each media controller 120 can execute commands independent of the other media controllers 120. Therefore, data can be transferred from one PHY interface 122 through a channel 125 to memory media device 126 independent of other PHY interfaces 122 and channels 125.

Each PHY interface 122 may operate in accordance with the PHY layer that couples the memory controller 100 to one or more memory ranks in the memory media device 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can be a plurality of channels 125.

As used herein, the term "memory ranks" generally refers to a plurality of memory chips (e.g., DRAM memory chips) that can be accessed simultaneously. In some embodiments, a memory rank can be sixty-four (64) bits wide and each memory rank can have eight (8) pages. In some embodiments, a page size of a first type of memory media device can be larger than a page size of the second type of memory media device. Example embodiments, however, are not limited to particular widths of memory ranks or page sizes.

Each media controller 120 may include a channel control circuitry 124 and a plurality of bank control circuitry 128 where a respective one of the plurality of bank control circuitry 128 is configured to access a respective bank 130 of the plurality of banks on the media device 126 accessed by the respective media controller 120.

Rank, channel, and bank can be considered hardware-dependent logical groupings of storage locations in the media device. The mapping of rank, channel and bank logical groupings to physical storage locations or rows in the memory media device 126 may be preconfigured, or may be configurable, in some embodiments by the memory controller in communication with the memory media device 126.

In some embodiments, the memory controller 100 can be a Compute Express Link™ (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning.

CXL technology is built on the PCIe infrastructure, leveraging PCIe physical and electrical interfaces to provide advanced protocol in areas such as I/O protocol, memory protocol (e.g., initially allowing a host to share memory with an accelerator), and coherency interface. When the memory controller 100 is CXL compliant, the interface management circuitry 108 (including data link and transaction control 108) may use CXL protocols to manage the interface 106 which may comprise PCIe PHY interfaces.

According to some embodiments, the memory media device 126 includes one or more DRAM devices. In some embodiments, main memory is stored in DRAM cells that have high storage density. DRAM cells lose their state over time. That is, the DRAM cells must be refreshed periodically, hence the name "Dynamic." DRAM can be described as being organized according to a hierarchy of storage organization comprising DIMM, rank, bank, and array. A DIMM comprises a plurality of DRAM chips, and the plurality of chips in a DIMM are organized into one or more "ranks."

Each chip is formed of a plurality of "banks." A bank is formed of one or more "rows" of the array of memory cells. All banks within the rank share all address and control pins. All banks are independent, but in some embodiments only one bank in a rank can be accessed at a time. Because of electrical constraints, only a few DIMMs can be attached to a bus. Ranks help increase the capacity on a DIMM.

Multiple DRAM chips are used for every access to improve data transfer bandwidth. Multiple banks are provided so that the computing system can be simultaneously working on different requests. To maximize density, arrays within a bank are made large, rows are wide, and row buffers are wide (8 KB read for a 64 B request). Each array provides a single bit to the output pin in a cycle (for high density and because there are few pins). DRAM chips are often described as ×N, where N refers to the number of output pins; one rank may be composed of eight ×8 DRAM chips (e.g., the data bus is 64 bits). Banks and ranks offer memory parallelism, and the memory controller 100 may schedule memory accesses to maximize row buffer hit rates and bank/rank parallelism.

In the embodiment illustrated in FIG. 1A, the memory media device 126 is low power double data rate (LPDDR) LP5 or other similar memory interfaces. However, embodiments are not limited thereto, and memory media device 126 may comprise one or more memory media of any memory media types, such as, but not limited to, types of DRAM, that are subject to row hammer attacks or similar memory attacks.

Each of the plurality of media controllers 120 can receive a same command (e.g., command to read or write memory media device 126) and address and drive the plurality of channels 125 substantially simultaneously. By using the same command and address for the plurality of media controllers, each of the plurality of media controllers 120 can utilize the plurality of channels 125 to perform the same memory operation on the same plurality memory cells. Each media controller 120 can correspond to a RAID component. As used herein, the term "substantially" intends that the characteristic needs not be absolute, but is close enough so as to achieve the advantages of the characteristic.

For example, "substantially simultaneously" is not limited to operations that are performed simultaneously and can include timings that are intended to be simultaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at the same time. For example, the multiple memory controllers can be utilized such that they are writing data to the memory devices at the same time, regardless if one of the media controllers commences or terminates prior to the other.

Figure 1B:
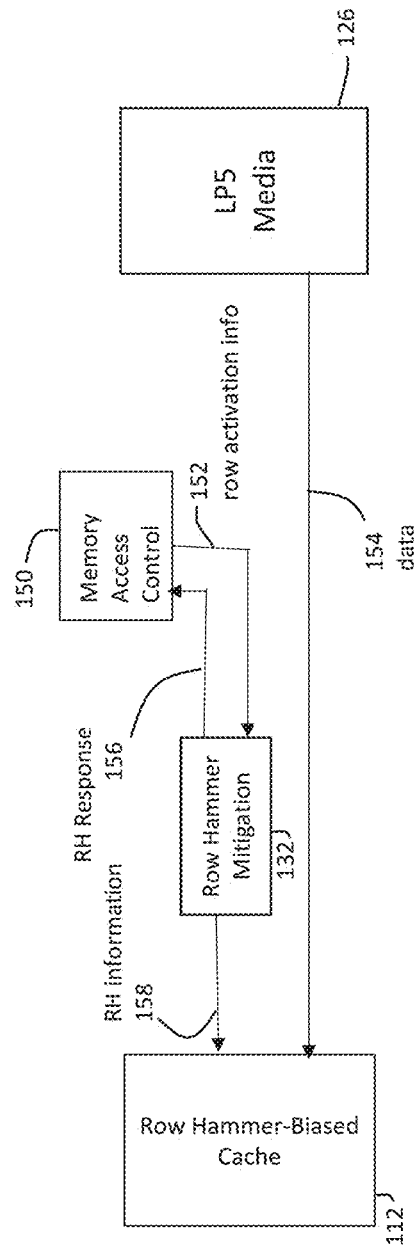
FIG. 1B schematically illustrates example communication signals exchanged between some components of the memory controller shown in FIG. 1A, according to some embodiments.

FIG. 1B illustrates some example communication signals exchanged between some components of the memory controller 100 shown in FIG. 1A, according to some embodiments. The cache memory 112 and the row hammer mitigation circuitry 132 are configured to operate in association with each other to mitigate the impact of row hammer attacks on the system 101 and to improve cache performance (e.g., improve the cache hit rate) by implementing a row activation-biased caching policy. The cache 112 may temporarily store data written by the host 103 to the memory media device 126 and data that is sought to be read by the host 103 from the memory media device 126.

For example, the memory data path of system 101 may provide for memory write requests from the host 103 to be written to the cache 112 and for any memory read requests from the host 103 to access data 154 from the memory media device 126 that is then stored in the cache 112. For each incoming request (read or write), a memory access control circuitry 150 may determine the one or more rows to be accessed in the memory media device 126 and may accordingly control the access to the memory media device 126 and/or cache 112. The memory access control circuitry 150 may include one or more of channel control circuit 124, bank control circuit 128, error control circuit 116, security circuit 114, management interface 135 and/or other specialized circuit to control aspects of accessing the memory media device 126.

In example embodiments, the memory access control circuitry 150 may provide row activation information 152 regarding row activations in the memory media device 126 (e.g., based on number of row access commands and/or row refresh commands transmitted by the memory access control circuitry 150) to the row hammer mitigation circuitry 132. In some embodiments, the memory access control circuitry 150, since it may have visibility to address information for all row accesses, may also provide that information for respective requests to the row hammer mitigation circuitry 132 and/or cache 112 (e.g., for use in deriving cache line tag information).

Figure 1C:
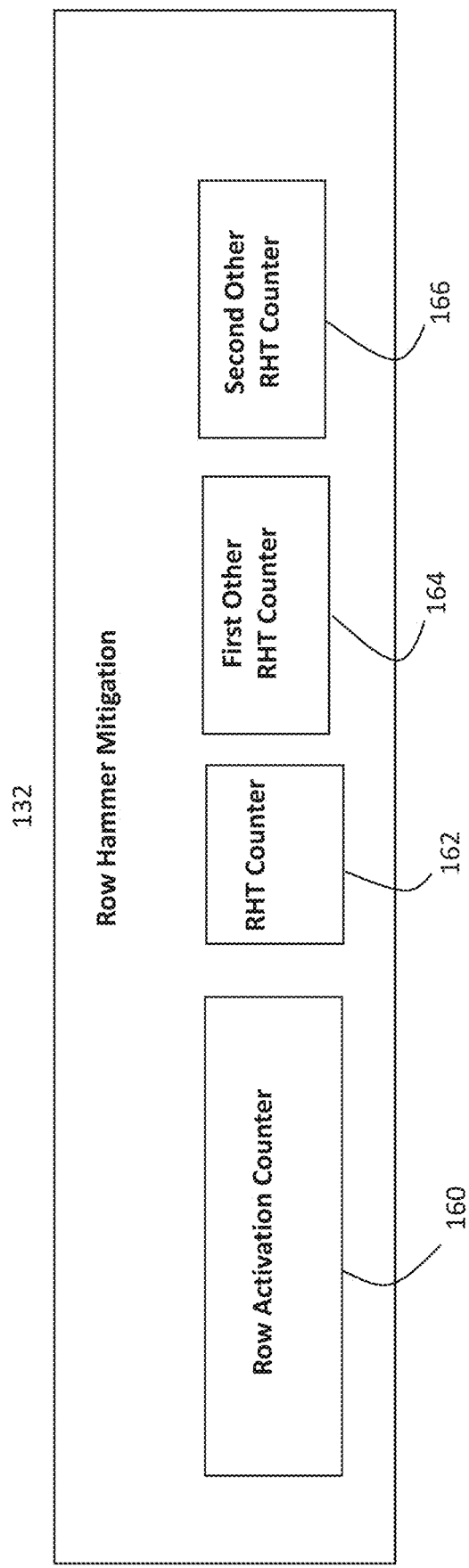
FIG. 1C schematically illustrates some of the data components stored for the row hammer mitigating circuit, in accordance with some embodiments.

As shown in FIG. 1C, the row hammer mitigation circuitry 132 maintains a set of counters 160 (row activation status memory) to track row activations for the rows in the memory media device 126, in accordance with row activation information 152 received from the memory access control circuitry 150. The set of counters may be maintained in an SRAM or content addressable memory (CAM). The row hammer mitigation circuitry 132, based on the set of counters, detects when respective rows exceed one of more preset thresholds such as, for example, the RHT or one or more other row hammer thresholds.

FIG. 1C illustrates the row hammer mitigation circuitry 132 including the counters 160 and RHT 162. In some embodiments, the row hammer mitigation circuitry 132 may also include a first other row hammer threshold counter 164 and a second other row hammer threshold counter 166.

The first other row hammer threshold corresponds to a row access count value less than which a row may be considered as less likely to be accessed and thus less likely to reach the RHT. The second other row hammer threshold corresponds to a row access count value that is higher than the first other row hammer threshold but is less than the RHT such that rows with row access counts that reaches the second other row hammer threshold are considered as more likely to be subsequently accessed and thus more likely to reach RHT within a short time duration.

When the row hammer mitigation circuitry 132 detects that a particular row (based on its count value in the corresponding counter in counters 160) has exceeded the RHT 162, it initiates a row hammer response. In some embodiments, for example, it may issue a row hammer response signal 156 to the memory access control circuit 150 so that the memory access control circuit 150 can send, or can cause the sending of, a row refresh or the like to the memory media device 126 to refresh the corresponding victim rows. In some embodiments, the row hammer mitigation circuitry 132, when it detects those accesses to a particular row of the memory media device 126 has exceeded the first or second other row hammer thresholds, may transmit row hammer information 158 to the cache 112.

For example, when it is detected that a row exceeded the first other row hammer threshold, the row hammer information 158 may include a corresponding notification for the row informing cache 112 that the row is no longer considered a less likely to be accessed row, and, when it is detected that a row exceeded the second other row hammer threshold, the row hammer information 158 may include a corresponding notification for the row informing cache 112 that the row is now to be considered a more likely to be accessed row, enabling cache 112 to bias its caching policy based on the respective row access statuses of the rows.

In example embodiments, the operation of the cache 112 includes biasing the caching policy based on the row hammer information 158 provided to the cache by the row hammer mitigation circuitry. The biasing may include, for example, overriding or supplementing its cache line replacement policy (also referred to as "cache line eviction policy") based on a row hammer status of a cache line. In some embodiments, the row hammer status may also be used to bias its cache line allocation policy, e.g., to determine whether a data from the memory media device 126 should be stored in the cache 112.

Figure 2A:
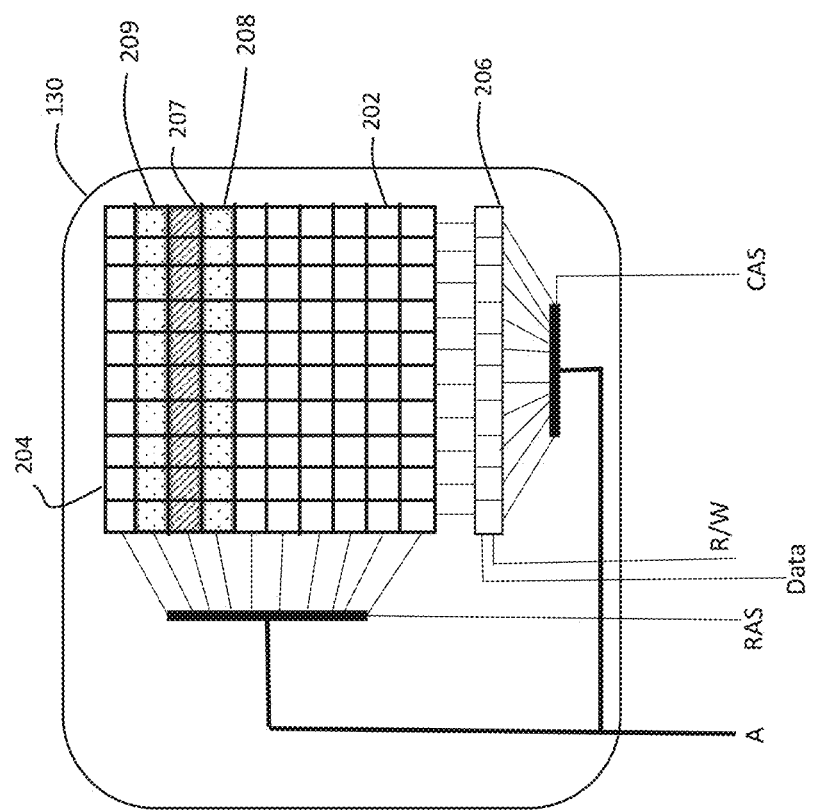
FIG. 2A illustrates a schematic view of a memory bank in a DRAM media device.

FIG. 2A illustrates a schematic view of a memory bank 130 viewed in a DRAM device such as memory device 126. The illustrated bank 130 represents a 10×10 array of cells organized in 10 rows (e.g., row 202) and 10 columns (e.g., column 204). The bank is stored to or read from, one row at a time, via a row buffer 206. Each cell in the array is accessed by providing a row address and a column address. The address bus (A), a row access strobe (RAS) signal, a column access strobe (CAS) signal (shown in FIG. 2A as A, RAS, CAS, respectively) are used to access particular memory locations in the array. The row buffer 206 and the data or read/write signals are used for the data to be read from or stored to memory locations.

In some memory devices, a counter, not shown in FIG. 2A, may be associated with a row to keep track of the number of times that row has been activated during a particular time interval. For example, the counter may be initialized at the beginning of each refresh interval and be incremented for each access to that row during that refresh interval. In conventional perfect tracking implementations, a respective counter was associated with each row. In example embodiments, the number of counters maintained is much smaller than the total number of rows in the memory device(s) attached to the memory controller.

Figure 2B:
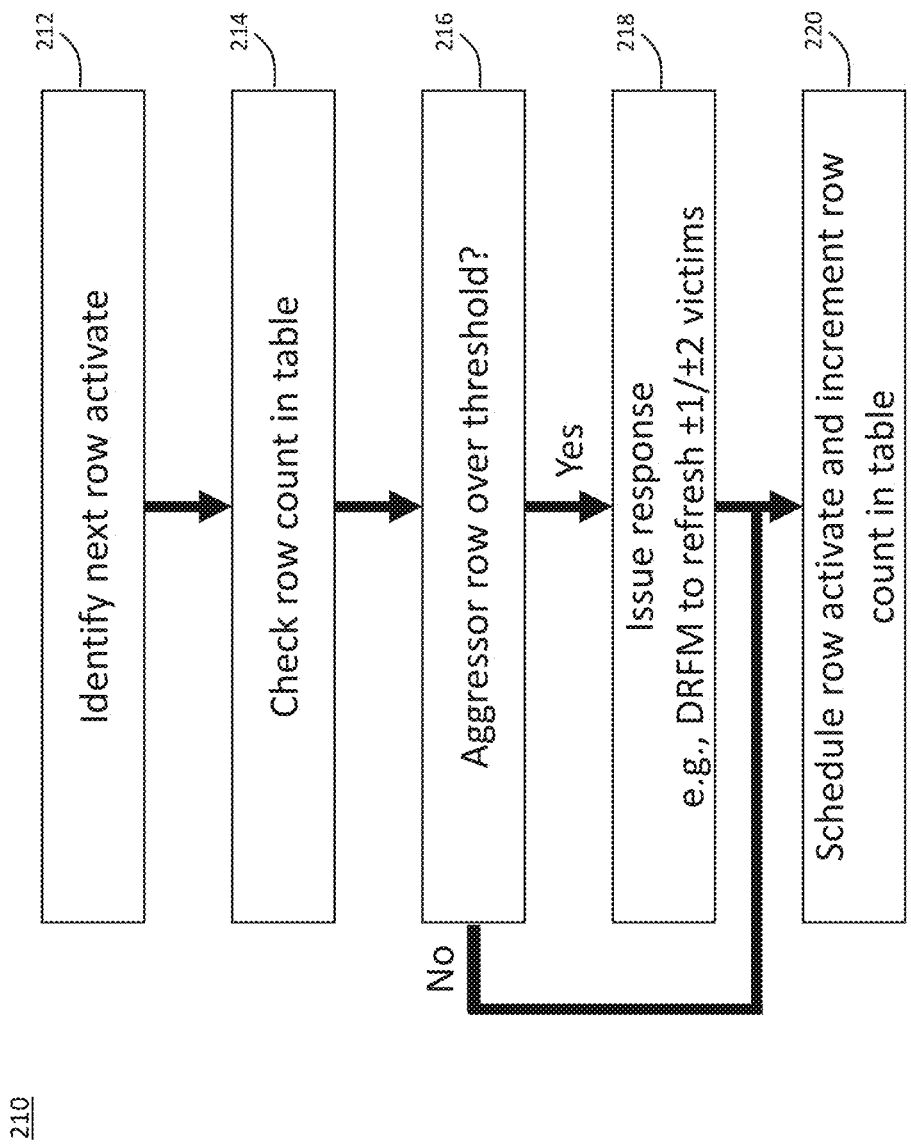
FIG. 2B illustrates a flowchart depicting a basic implementation flow of row hammer mitigation.

FIG. 2B illustrates a flowchart 210 depicting a basic implementation flow of row hammer mitigation. Row hammer mitigation includes two aspects: the first aspect is row hammer detection, and the second aspect is the response to that detection. A variety of responses are possible. A response commanding the memory media device 126 to refresh victim rows, for example a digital refresh management (DRFM) response) is one possible response to mitigate or eliminate the effects of row hammer effects.

In some instances, the memory controller transmits a refresh command, such as a DRFM response, to the memory media device 126 and specifies the aggressor row, and the memory media device's internal circuitry determines the victim rows to be refreshed based on the aggressor row identified by the memory controller and refreshes the victim rows.

When a request is received to access a row, which may be referred to as an aggressor row (row 207 in FIG. 2A) in this disclosure, in the memory media device 126, at operation 212 that row is identified as the next row to activate. At operation 214, a value of a counter configured to keep track of the number of accesses to the aggressor row in a predetermined time period is checked. At operation 216, it is determined whether the value of the counter is above the RHT.

When the RHT is exceeded for the aggressor row 207, the integrity of the data in one or more victim rows (208 and 209 in FIG. 2A) physically adjacent to the aggressor row 207 cannot be guaranteed. The RHT may be factory set or may be configured at boot time and may depend on the type of the memory media device. If the value is above the RHT, then at operation 218 a response is issued.

One type of response may be a digital refresh management (DRFM) command to refresh the physically adjacent rows (e.g., rows 208 and 209) on either side of the aggressor row 207. When a response is issued at operation 218, the counters of the victim rows 208 and 209, which are refreshed, can be reset (e.g., set to 0). The number of physically adjacent rows to refresh may be preconfigured or may be dynamically determined. After issuing the response at 218, or if at operation 216 it was determined that the aggressor row 207 is not over the RHT, at operation 220, the row activate for the aggressor row is scheduled and the counter for that row is incremented (e.g., incremented by 1).

As noted above, memory device 126 such as, for example, one or more DRAM DIMMs, can be subject to row hammer attacks, and several approaches are being used to either eliminate or reduce the effects of such attacks. Whereas the conventional techniques of row hammer mitigation that are currently implemented in memory systems, to the knowledge of the inventors, fall short in terms of practicality in either energy efficiency and/or space efficiency, the example embodiments of the present disclosure provide a row hammer mitigation technique that provides perfect tracking (i.e., does not allow any false negative row hammer detection) of row hammer attacks in a practical, energy and space efficient manner.

Figure 3:
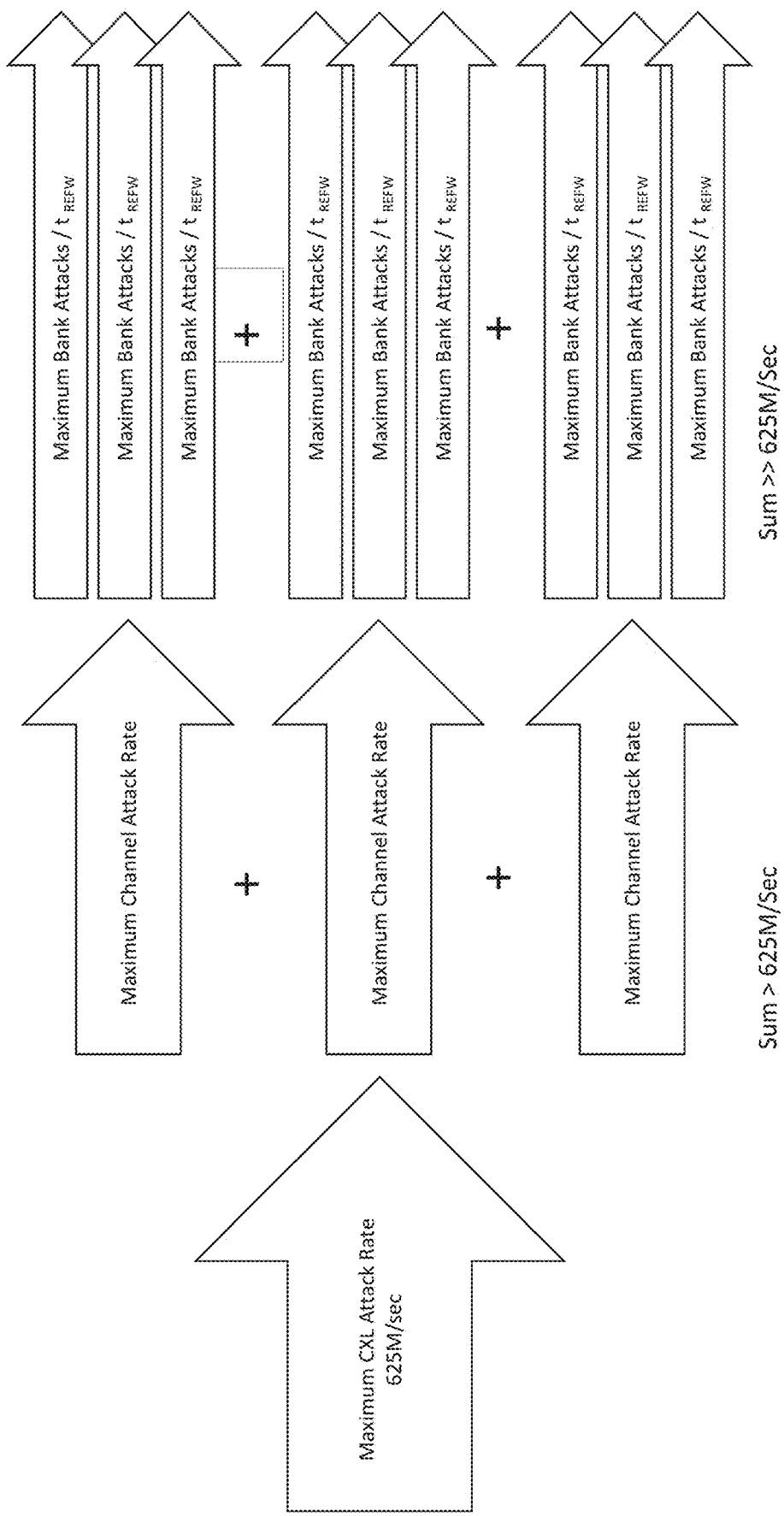
FIG. 3 graphically illustrates an example distribution of row hammer events at the global level in a memory controller, at the channel level and at the bank level.

As shown in FIG. 3, in some example scenarios in which a DRAM memory device is attached to a CXL-compliant memory controller, the global rate of row hammer attacks on the memory device may be about 625 million attacks per second. Thus, if perfect row hammer detection is implemented at the global level for the attached memory device, the row hammer detector must be configured with sufficient counters to detect at least that many attacks occurring in the duration of a second.

For example, in the embodiment shown in FIG. 1A, if perfect row tracking were to be implemented globally, the central controller 110 could be configured with a row hammer mitigation circuitry that receives row access information for rows in the attached memory device from the media controllers 120 potentially at the rate of 625 million per second, and communicates mitigation responses (e.g., DRFM) to the respective media controllers 120 as needed.

If per-channel row hammer mitigation is implemented for each media controller 120, then the sum of the attack rates that can be handled by the respective media controllers 120 must at least amount to the 625 million/sec, but such an implementation will be capable of, and accordingly use the space and energy resources required, for tracking a substantially higher rate of row updates because the resources are configured on a per channel basis.

Similarly, if per-bank row hammer mitigation is implemented in each bank controller 128 for each bank in a channel, then the sum of attack rates that can be handled by all the bank controllers must at least amount to the 625 million/sec, but such an implementation will be capable of, and accordingly use the space and energy resources required for, detecting a substantially higher detection rate because the resources are configured on a per-bank basis.

Thus, the total amount of space and energy resources that may be required to implement row hammer detection at the bank level exceeds the amount of space and energy resources that may be required at the channel level, which in turn exceeds that of the global level implementation. Various approaches may be considered to achieve perfect (deterministic) row hammer tracking in the memory controller by accessing multiple rows as one unit (same row on different chips) and thus having only one counter for the group, rather than having a counter for each row of the media device.

As noted above, memory media device 126 such as, for example, DRAM, can be subject to row hammer attacks, and several approaches are being used to either eliminate or reduce the effects of such attacks. Whereas the conventional techniques of row hammer mitigation that are currently implemented in memory media devices, to the knowledge of the inventors, fall short in either energy efficiency and/or space efficiency, the commonly assigned related applications noted above, provide row hammer mitigation techniques that provide perfect tracking (i.e., does not allow any false negative row hammer detection) of row hammer attacks in practical, energy and/or space efficient manner. The described approaches track row accesses using a number of counters that is less than the number of memory media device rows that are being monitored.

The inventors recognized that the row hammer mitigation activity of tracking highly accessed data closely corresponds to the goal of cache memories to improve cache hit rate by keeping highly accessed data in the cache, and that implementing row hammer mitigation in the memory controller (e.g., such as in the memory controller 100) provides an opportunity to leverage the row hammer mitigation and the cache to improve the performance of each. For example, as also noted above, example embodiments enable the cache to be used as a row hammer response while the cache uses row activation information collected for row hammer mitigation to improve its hit ratio.

Figure 4A:
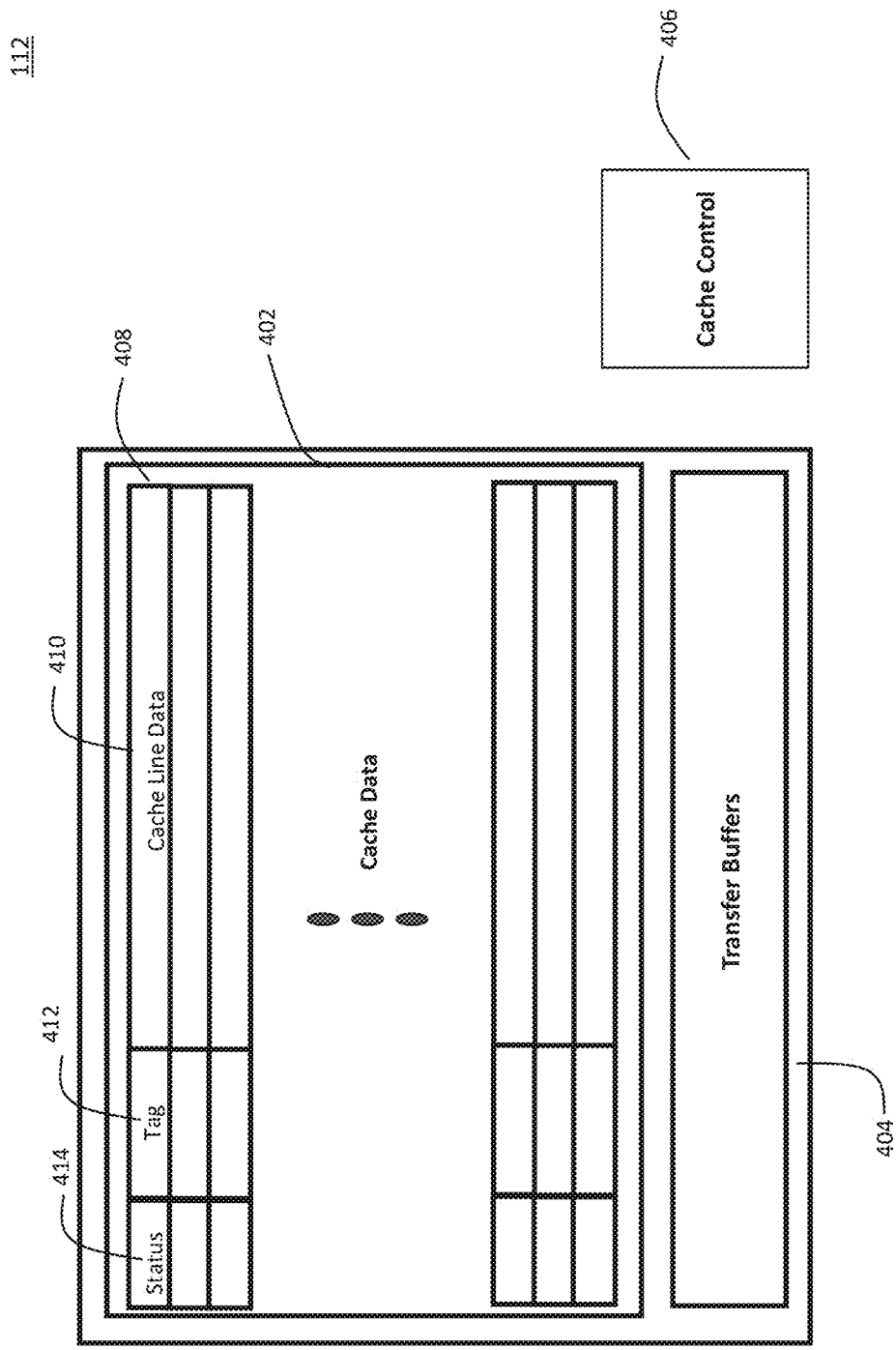
FIGS. 4A and 4B schematically illustrate a row activation-biased cache, according to some embodiments.

FIG. 4A illustrates an example cache 112 according to some embodiments. Cache 112 may comprise cache data 402, transfer buffers 404 and cache control circuitry 406. The cache data 402 comprises a plurality of cache lines 408, each comprising cache line data 410. Each cache line 408 also includes a tag 412 that indicates where the cache line data 410 of this cache line 408 is located in the memory media device 126. Each cache line 408 may also include a status field 414 that indicates status information for the cache line 408.

Transfer buffers 404 hold one or more cache lines of data temporarily before the data is written to the cache, and/or hold data when data is read from the cache 112. Cache control circuit 406 controls access to the cache, including to the cache data 402. In some embodiments, cache control circuit 406 is configured to communicate with the row hammer mitigation circuitry 132 to receive row hammer information 158 and to accordingly control biasing of caching policy for the cache 112.

In some embodiments, a cache line in cache 112 may map to one or more rows in the memory media device 126. Alternately, in some embodiments, each row in the memory media device 126 maps to one or more cache lines. This mapping may be provided by the tags in the respective cache lines, or more specifically, the address information included in the respective tags. In some embodiments, the cache control circuitry 406 may maintain a separate set of mapping between cache lines and rows in the memory media device.

Figure 4B:
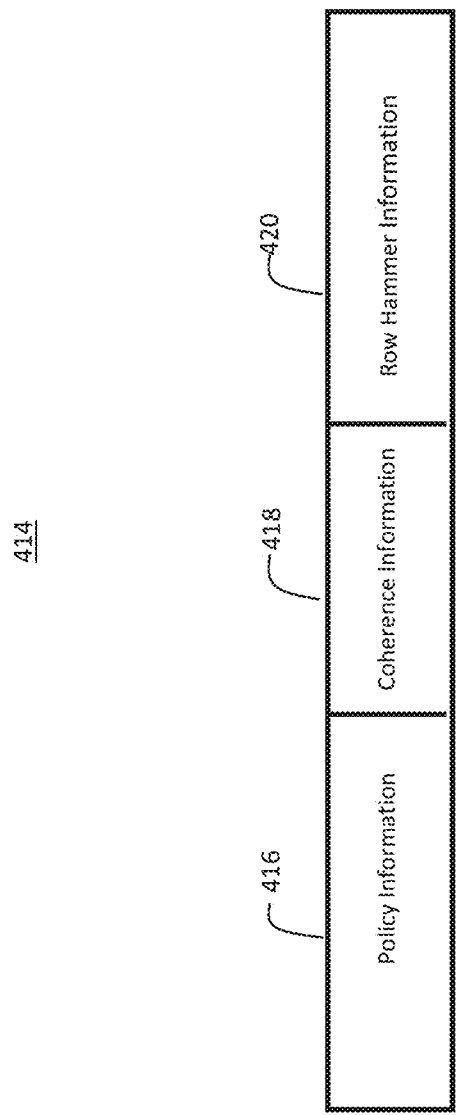

FIG. 4B illustrates an example format of the status field 414, according to some embodiments. The status field 414 may include cache policy information 416, cache coherence information 418 and row hammer information 420. The cache policy information 416 for a cache line 408 relates to the cache line replacement policy, such as, for example, a least recently used (LRU) replacement policy, and may indicate the LRU status of the cache line 408. For example, the field 416 may provide for the cache lines to be arranged in the order of last time of access to provide for the cache 112 to, when a cache line must be selected for replacement, enable the selection of the least recently accessed cache line for replacement.

Since the cache memory 112 is substantially smaller than the memory media device 126 (e.g., main memory) for which it is operating as the cache, caching often involves replacing (also referred to as evicting) an already stored cache line of data to write a new cache line. In example embodiments, the selection of the evictable cache line (also referred to as victim cache line) is, among other aspects, also based upon the row hammer status 420 of respective candidate evictable cache lines.

The replacement policy, in an associative cache, may be random (e.g., select a cache line at random from among all cache lines) or round-robin (e.g., select in some order of fixed sequence from among all cache lines). The replacement policy may also be FIFO (first-in-first-out), such as oldest cache line or LRU (e.g., the cache line that has not been used the longest time). In example embodiments, cache lines which, in their respective corresponding row hammer information 420 fields, indicate that they are considered likely to reach the row hammer threshold soon. For example, a cache line for which its row hammer information 420 indicates that its count has exceeded the second other row hammer threshold) are biased against selection for eviction.

Thus, in example embodiments, at operation 604, a cache line that is next in line according to the active replacement policy (e.g., random, round robin, FIFO, or LRU) and which is not indicated as being likely to reach the row hammer threshold soon is selected for eviction and is evicted from the cache.

Cache coherence information 418 indicates whether the cache line is a write-through cache line, the associativity, and the dirty status of the cache line. With a write-allocate policy, data from a memory write request is first written to cache, and then, when the cache line is evicted from the cache, that data is written to main memory. With a write-through policy data from a memory write request is written to the cache and to the main memory simultaneously or near simultaneously.

The row hammer information 420 for cache line 408, in some embodiments, indicate whether the cache line corresponds to data in a memory media device row that has exceeded the first other row hammer threshold, or the second other row hammer threshold. As noted above, a cache line 408 that includes valid data but which is not indicated as having exceeded the first other RHT may be considered as being unlikely to reach RHT 162, and a cache line 408 that has exceeded the second other row hammer threshold may be considered as being very likely to reach RHT 162 within a short time duration.

In another embodiment, the row hammer information 420 may include a row access count associated with the corresponding row in the memory media device. The number of bits provided with which to represent the row hammer count may be the same or less than the number of bits used in the corresponding counters in the row hammer mitigation circuitry 132.

The row hammer information 420 of each cache line is an indication of the current row hammer status, or a row activation level status, of the cache line's data in the corresponding memory media device row. In may also be considered an indication of the volume of row activations (within a current time window) for that corresponding memory media device row. In one embodiment, the row hammer information 420 comprises one bit which, when set indicates that the cache line is likely to reach RHT soon, and when not set indicates otherwise.

Figure 5:
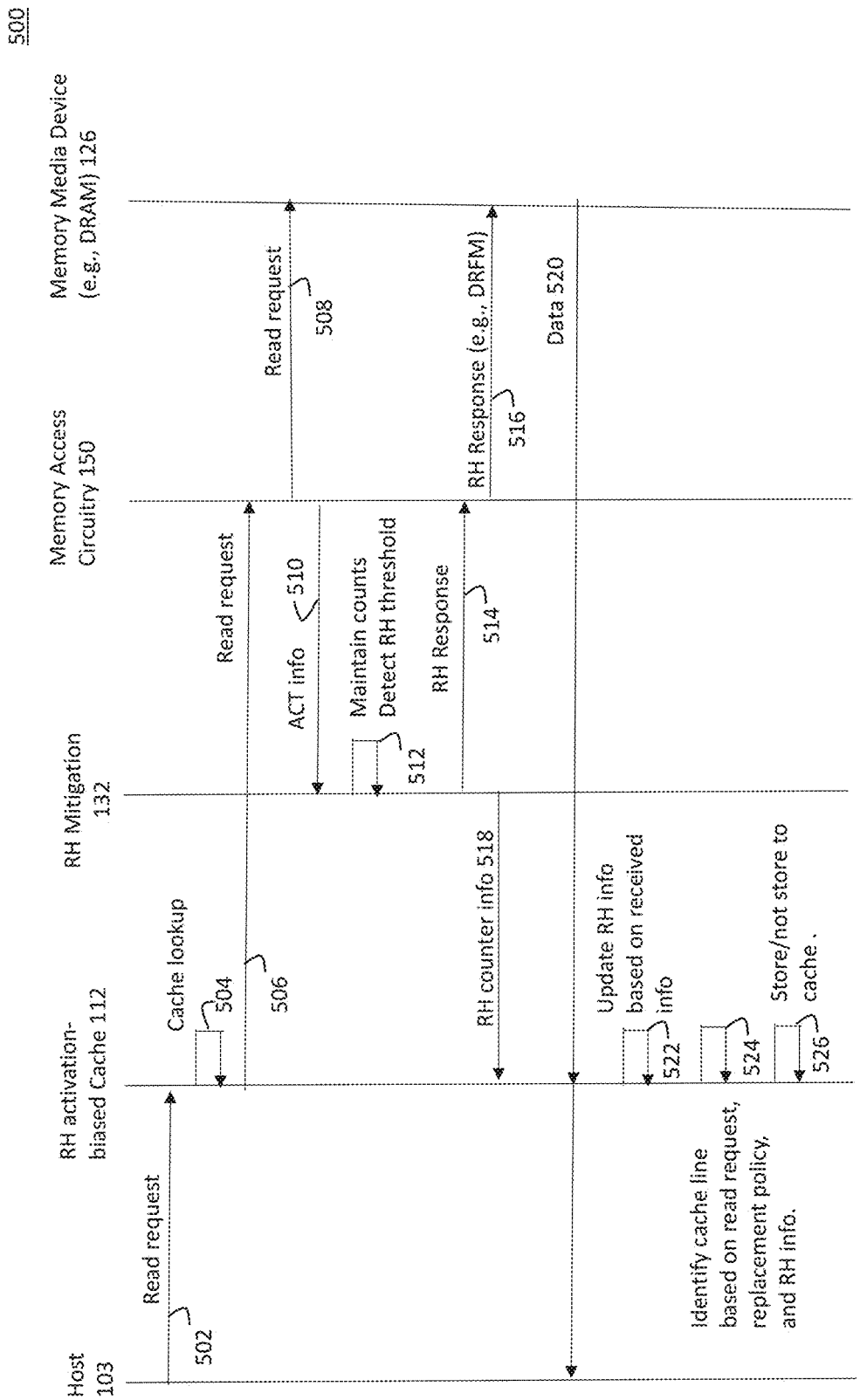
FIG. 5 is a flowchart of a process for a host to read data stored in a media storage device in a system including a row activation-biased cache, according to some embodiments.

FIG. 5 illustrates a process 500 for servicing a memory read request 502 in a system such as the system 101, in accordance with an example embodiment.

At operation 502, a read request is received from host 103 to read data from memory media device 126 (e.g., a main memory of the system 101). For example, the read request is received over interface 102 at the memory controller 100. In some embodiments, the read request may include at least the address of the data in main memory and an address to which the data is to be returned.

A cache lookup operation 504 is performed to determine whether the data for the read request is in present in the cache 112. In the illustrated embodiment, the cache 112 (e.g., using cache control circuitry 406) initiates the cache lookup. In some embodiments, however, the cache lookup may be initiated by the memory access control circuitry 150.

If the data for the read request is present in the cache 112, the data is returned from the cache 112 to the requesting host 103. That is, if a cache line corresponding to the main memory address specified in the read request is found (e.g., the tag field 412 of a cache line indicates the main memory address associated with the cache line) in the cache 112, then the data of that cache line is returned in response to the read request. Thus, when the data corresponding to a read request is present in the cache, then, at least in some embodiments, no access for the data requested in the read request is made to the memory media device 126. Therefore, when the requested data is present in the cache 112, the data is provided to the requester directly from the cache without causing the row activation count for the corresponding row in the memory media device to be incremented.

If the data for the read request is not present in the cache 112, then memory access control circuitry 150 is notified at operation 506, and the memory access control circuitry 150 issues a read request 508 to the memory media device 126. The memory access control circuitry 150 may also notify the row hammer mitigation circuitry 132 about a row activation command (operation 510) for the corresponding row in the memory media device 126. The row is identified in accordance with the main memory address specified in the read request received from the host.

At operation 512, the row hammer mitigation circuitry 132 updates its row hammer counters based on the received row activation information. For example, the corresponding counter(s) 160 maintained in the row hammer mitigation circuitry 132 are incremented in accordance with received row activation information. The row hammer mitigation circuitry 132 may also determine whether the incrementing caused any row to exceed the RHT 162 or any of the other row hammer thresholds 164-166.

If the RHT 162 is exceeded, then at operation 514, the row hammer mitigation circuitry 132 notifies memory access control circuitry to issue a row hammer response. In response, memory access control circuitry 150 may issue a DRFM 516 or the like to refresh the victim rows of the row which exceeded the RHT.

If it is determined at operation 512 that any of the RHT 162 or one or more of the other row hammer threshold counter thresholds are exceeded for a row, then at 518, the row hammer mitigation circuitry 132 notifies the cache 112. The notification may include count information for a row and the corresponding row identifier. The count information may include one or more of a value of a row activation counter, an indication that the RHT was exceeded, an indication that the first other row hammer threshold was exceeded, or an indication that the second other row hammer threshold was exceeded.

When the RHT is exceeded, as in the particular scenario illustrated in FIG. 5, the notification 518 can be used by the cache 112 as an indication that the row activation count for the row is reset. In an alternative scenario, where instead of the row exceeding the RHT 162, the row exceeds one of the other row hammer thresholds 164-166, then, operation 518 indicates to the threshold exceeded to enable the cache 112 to accordingly adjust its caching policy.

At operation 520, the data in response to the read request 508 is retrieved, and, at operations 522-526, it is determined, in accordance with the cache's allocation policy and replacement policy, whether the retrieved data is written to the cache 112.

At operation 522, the cache 112, for example, using cache control circuitry 406, may cause updates to the row hammer information 420 of one or more cache lines in accordance with the row hammer count information received at operation 518. For example, if the row hammer count information at operation 518 indicated that the RHT of a cache line was exceeded, then the row hammer information 420 for the corresponding cache line is set to indicate that the cache line has not exceeded the first other row hammer threshold.

Alternatively, if operation 518 informed that the first other row hammer threshold or the second other row hammer threshold were exceeded, then the row hammer information 420 for the corresponding cache line is set to indicate the corresponding statuses. In embodiments in which the row hammer information 420 comprises row activation count values, then the row hammer count information received at operation 518 is used to correspondingly update the counts in the row hammer information 420.

If the cache line corresponding to the row referred to in operation 522 already exists in the cache 112, the updates according to operation 522 can be made directly in the row hammer information 420 of that cache line. In some embodiments, the cache 112 may include temporary buffers (e.g., transfer buffers 404) to hold the cache line data and/or row hammer information 420 for a cache line for one or more cache lines to temporarily hold the data received from the memory media device 126 and/or the counter information received from the row hammer mitigation circuitry 132 until a decision to store in the cache is made at operations 524-526.

At operation 524, the cache 112 determines whether to cache the returned data in accordance with, among other things, also row hammer information 420. When the row hammer information 420 for the cache line indicates that the corresponding row has not exceeded the first other row hammer threshold, the data is returned to the requester without storing that data in the cache.

Alternatively, when the row hammer information 420 indicates that the corresponding row has exceeded the second other row hammer threshold, the cache will store the data so that subsequent requests to that row can be serviced from the cache 112 without having to access the row in the memory media device. When storing the new cache line, a victim cache line should be selected. The selection may consider the cache policy status 416 and/or the row hammer information 420 of each candidate cache line 408. For example, the cache line selected as the victim cache line will be the cache line that is least recently used among cache lines that are not indicated in the respective row hammer information 420 as having exceeded the second other row hammer threshold.

In example embodiments, the selection of the evictable cache line (also referred to as victim cache line) is, among other aspects, also based upon the row hammer status 420 of respective candidate evictable cache lines. The replacement policy, in an associative cache, may be random (e.g., select a cache line at random from among all cache lines), round-robin (e.g., select in some order of fixed sequence from among all cache lines), FIFO (e.g., select oldest cache line) or LRU (e.g., the cache line that has not been used the longest time).

In example embodiments, cache lines which, in their respective corresponding row hammer information 420 fields, indicate that they are considered likely to reach the row hammer threshold soon (for example, a cache line for which its row hammer information 420 indicates that its count has exceeded the second other row hammer threshold) are biased against selection for eviction. Thus, in example embodiments, at operation 604, a cache line that is next in line according to the active replacement policy (e.g., random, round robin, FIFO, or LRU) and which is not indicated as being likely to reach the row hammer threshold soon is selected for eviction and is evicted from the cache.

At operation 526, in accordance with the determination made at operation 524, the data returned in response to the read request either stored or not stored in the cache. When the data is stored in the cache, the data may be written in the cache location occupied by the selected evictable cache line. Moreover, the row hammer information 420 of the cache line is updated in accordance with the information received at operation 518.

Figure 6:
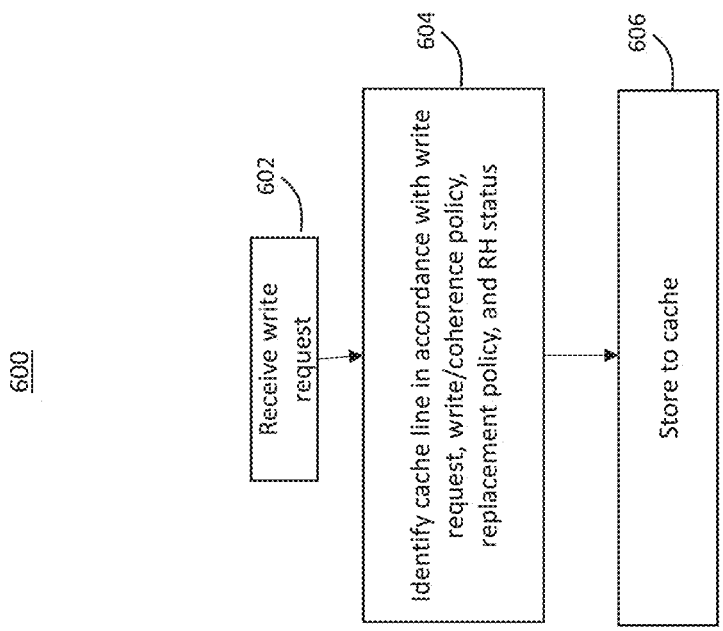
FIG. 6 is a flowchart of a process for a host to write data to a media storage device in a system including a row activation-biased cache, according to some embodiments.

FIG. 6 illustrates an exemplary process 600 for the system 101 to handle a memory write request received from the host 103, according to some embodiments.

At operation 602, the memory write request is received from host 103 to write data from memory media device 126

(e.g., a main memory of the system 101). For example, the write request is received over interface 102 at the memory controller 100.

Write requests may be handled in various ways. Systems in which the write request data is not initially stored in the cache (e.g., systems that directly write the data to the main memory, and systems that marks the corresponding cache line as dirty but writes the data directly to memory) may not operate differently based on whether cache 112 is a row hammer biased cache. In contrast, write-allocate and write-through caches may operate differently based on whether cache 112 is a row hammer biased cache. With a write-allocate policy, data from a memory write request is first written to cache, and then, when the cache line is evicted from the cache, that data is written to main memory. With a write-through policy data from a memory write request is written to the cache and to the main memory simultaneously or near simultaneously.

At operation 604, in one embodiment, a cache lookup operation is performed to determine whether the cache line corresponding to the row in the memory media device to which the data of the write request is to be written is present in the cache 112. If the corresponding cache line is present in the cache, then, in one embodiment, the data from the memory write request is stored in that corresponding cache line.

If the corresponding cache line is not present in the cache 112 but an available cache line (e.g., cache line that does not contain valid data) exists in the cache 112, then the data from the memory write request is stored in that available cache line. If the corresponding cache line is not present in the cache 112 and no available cache line exists in the cache, then, when the cache 112 has a write-allocate policy or write-through policy, a cache line must be evicted to store that data of the memory access request.

In example embodiments, the selection of the evictable cache line is, among other aspects, also based upon the row hammer status 420 of respective candidate evictable cache lines. The replacement policy, in an associative cache, may be random, round-robin, FIFO, or LRU. In example embodiments, cache lines which, in their respective corresponding row hammer information 420 fields, indicate that they are considered likely to reach the row hammer threshold soon. For example, a cache line for which its row hammer information 420 indicates that its count has exceeded the second other row hammer threshold) are biased against selection for eviction.

Thus, in example embodiments, at operation 604, a cache line that is next in line according to the active replacement policy (e.g., random, round robin, FIFO, or LRU) and which is not indicated as being likely to reach the row hammer threshold soon is selected for eviction and is evicted from the cache. At operation 606, the data from the write request is written to the cache in place of the evicted cache line.

FIG. 7 illustrates a table 700 of some other row hammer attack response techniques that can be implemented in some example embodiments in combination with bias cache replacement policies. The refresh techniques include increased refresh, ACT/Pre neighbor rows, poor man's DRFM, EDAC scrub neighbors, throttling row activations to CRHA rows (e.g., rows with high row activation counts), responding to the row access request with a Data Bad message, alerting and/or interrupting the host to indicate that the RHT has been exceeded.

As illustrated in the table 700, several of the response techniques guarantee data integrity and also do not require the media device's repair map. Guarantee of data integrity increases the reliability of data read from the media device. Not requiring the repair map increases the flexibility of the response technique, and also the applicability of the response techniques to media devices from different manufacturers etc.

As can be seen in the table 700, DRFM guarantees data integrity, does not require the media device's repair map, and also has a low response time, indicating it as a response technique that can be used efficiently in example embodiments. However, embodiments are not limited to using DRFM as the response to row hammer attacks.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

It should be noted that the methods described above describe possible implementations, and that the operations and the steps may be rearranged or otherwise modified and that other implementations are possible. Further, portions from two or more of the methods may be combined.

For example, the various illustrative blocks and components described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A cache memory comprising:
   a plurality of cache lines;
   row activation status memory comprising a row activation status associated with each of the plurality of cache lines, the row activation status of each cache line indicating information of a volume of accesses in a memory media device to a row corresponding to said each cache line; and
   a control circuitry configured to perform operations comprising, in response to a request to store data in the plurality of cache lines, at least one of:
      determining, based at least on said information of the volume of accesses to a row associated with the data, whether or not to store the data in at least one cache line in the plurality of cache lines; and
      selecting, based at least on said row activation status of the plurality of cache lines, a cache line to be evicted; and
   wherein the row activation status comprises a bit indicating a row hammer status, wherein when the bit is set, the control circuitry is configured to bias the corresponding cache line against eviction.

2. The cache memory according to claim 1, wherein the control circuitry is further configured to perform operations comprising determining, based at least on said information of the volume of accesses to a row associated with the data, whether or not to store the data in the plurality of cache lines.

3. The cache memory according to claim 2, wherein the control circuitry is further configured to, when the information of the volume of accesses to the row indicates that the volume of accesses to the row is less than a preset first threshold, determining not to store the data in the plurality of cache lines.

4. The cache memory according to claim 1, wherein the control circuitry is further configured to perform operations comprising selecting, based at least on said row activation status of the plurality of cache lines, the cache line to be evicted.

5. The cache memory according to claim 4, wherein the selecting is further based on a preset cache line eviction policy.

6. The cache memory according to claim 5, wherein the cache line eviction policy comprises a least recently used eviction policy, or a first-in-first-out eviction policy.

7. The cache memory according to claim 1, wherein the row activation status comprises a row activation count.

8. The cache memory according to claim 1, wherein the control circuitry is further configured to reset the row activation status of a cache line in response to a row refresh message sent to the memory media device.

9. The cache memory according to claim 1, wherein the row activation status comprises an indication whether the associated volume of accesses exceeds one or more preset thresholds.

10. The cache memory according to claim 9, wherein the control circuitry is further configured to receive the information of said volume of accesses over an interface with a row hammer mitigation circuit and said one or more preset thresholds are associated with a row hammer threshold.

11. A memory controller comprising a cache memory, wherein the cache memory comprises:
   a plurality of cache lines;
   row activation status memory comprising a row activation status associated with each of the plurality of cache lines, the row activation status of each cache line indicating information of a volume of accesses in a memory media device to a row corresponding to said each cache line; and
   a control circuitry configured to perform operations comprising, in response to a request to store data, at least one of:
      determining, based at least on said information of the volume of accesses to a row associated with the data, whether or not to store the data in at least one cache line in the plurality of cache lines; and
      selecting, based at least on said row activation status of the plurality of cache lines, a cache line to be evicted;
   wherein the row activation status comprises a bit indicating a row hammer status, wherein when the bit is set, the control circuitry is configured to bias the corresponding cache line against eviction.

12. The memory controller according to claim 11, wherein the control circuitry is further configured to perform operations comprising determining, based at least on said information of the volume of accesses to a row associated with the data, whether or not to store the data in the plurality of cache lines.

13. The memory controller according to claim 12, wherein the control circuitry is further configured to, when the information of the volume of accesses to the row indicates that the volume of accesses to the row is less than a preset first threshold, determining not to store the data in the plurality of cache lines.

14. The memory controller according to claim 11, wherein the control circuitry is further configured to perform operations comprising selecting, based at least on said row activation status of the plurality of cache lines, the cache line to be evicted.

15. The memory controller according to claim 14, wherein the selecting is further based on a preset cache line eviction policy.

16. The memory controller according to claim 11, wherein the row activation status comprises a row activation count.

17. The memory controller according to claim 11, wherein the row activation status comprises an indication whether the associated volume of accesses exceeds one or more preset thresholds.

18. The memory controller according to claim 11, further comprising row activation counting circuitry configured to transmit said information of the volume of accesses to the row associated with the data to the cache memory.

* * * * *